United States Patent
Perrier et al.

(10) Patent No.: US 11,460,564 B2
(45) Date of Patent: Oct. 4, 2022

(54) METHOD FOR CALIBRATING AN ACOUSTIC ANTENNA

(71) Applicant: Commissariat A L'Energie Atomique et aux Energies Alternatives, Paris (FR)

(72) Inventors: Regis Perrier, Grenoble (FR); Van-Tri Nguyen, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 54 days.

(21) Appl. No.: 16/922,388

(22) Filed: Jul. 7, 2020

(65) Prior Publication Data

US 2021/0011142 A1 Jan. 14, 2021

(30) Foreign Application Priority Data

Jul. 8, 2019 (FR) ..................................... 19 07639

(51) Int. Cl.
  *G01S 7/526* (2006.01)
  *G01S 7/52* (2006.01)
(52) U.S. Cl.
  CPC .......... *G01S 7/52004* (2013.01); *G01S 7/526* (2013.01)
(58) Field of Classification Search
  CPC .............................. G01S 7/52004; G01S 7/526
  See application file for complete search history.

(56) References Cited

U.S. PATENT DOCUMENTS

| 8,892,383 B2 | 11/2014 | Hara et al. |
| 2007/0036377 A1* | 2/2007 | Stirnemann .......... H04R 25/505 381/315 |
| 2011/0164467 A1* | 7/2011 | Pocwiardowski ..... G01V 13/00 367/13 |

FOREIGN PATENT DOCUMENTS

| FR | 2 699 687 A1 | 6/1994 | |
| FR | 2699687 A1 * | 6/1994 | ........... G01S 13/765 |
| JP | 2015194465 A * | 11/2015 | |

OTHER PUBLICATIONS

French Preliminary Search Report dated May 25, 2020 in French Application 19 07639 filed Jul. 8, 2019 (with English Translation of Categories of Cited Documents and Written Opinion), citing documents AA and AO therein, 11 pages.

(Continued)

*Primary Examiner* — Isam A Alsomiri
*Assistant Examiner* — Abdallah Abulaban
(74) *Attorney, Agent, or Firm* — Oblon, McClelland, Maier & Neustadt, L.L.P.

(57) ABSTRACT

A method for calibrating an acoustic antenna including elementary transducers distributed over an antenna row or plane, about a reference transducer, the antenna defining a main axis, passing through the reference transducer, and perpendicular to the antenna row or plane, the method including: measuring signals generated by elementary transducers in response to a calibration acoustic wave from a calibration source; on the basis of these measurements, determining a temporal phase shift of the signal respectively generated by each elementary transducer; reiterating the above steps in such a way that, in at least one iteration, the position of the calibration source may be considered to be centered on the main axis; and estimating a phase shift of each elementary transducer with respect to the reference transducer.

13 Claims, 7 Drawing Sheets

(56) References Cited

OTHER PUBLICATIONS

Astely, D. et al., "Spatial Signature Estimation for Uniform Linear Arrays with Unknown Receiver Gains and Phases," IEEE Transactions on Signal Processing, vol. 47, No. 8, Aug. 1999, 11 pages.
Viberg, M. et al., "A Bayesian Approach to Auto-Calibration for Parametric Array Signal Processing," IEEE Transactions on Signal Processing, vol. 42, No. 12, Dec. 1994, 13 pages.
Ng, B. C. et al., "Active array sensor localization," Signal Processing, vol. 44, 1995, 19 pages.
Friedlander, B. et al., "Eigenstructure Methods for Direction Finding with Sensor Gain and Phase Uncertainties," International Conference on Acoustics, Speech, and Signal Processing, vol. 5, doi: 10.1109/ICASSP.1988.197201, 1988, 4 pages.

* cited by examiner

METHOD FOR CALIBRATING AN ACOUSTIC ANTENNA

TECHNICAL FIELD

The technical field of the invention is the field of acoustic antennas.

PRIOR ART

An acoustic antenna is formed from independent transducers, placed on a support. In response to an acoustic wave propagating to the antenna, each transducer generates a signal, the signals respectively generated by the various transducers being individually accessible.

Such antennas are currently used in everyday devices. For example, sonars located onboard a vehicle may be equipped therewith, so as to detect the presence of an obstacle in proximity to the vehicle.

The growth of the development of transducers of electro-mechanical-resonator type, whether they be MEMS (Microelectromechanical Systems) or NEMS (Nanoelectromechanical Systems), has allowed acoustic antennas to be manufactured at lower cost. Specifically, these transducers are manufactured using wafer-scale microfabrication processes, this decreasing their manufacturing cost.

Generally, the transducers extend either over a row or an area that is most often planar. One of the consequences of the use of low-cost transducers is the presence of imperfections. Thus, in a given antenna, the gain and phase of the various transducers may exhibit substantial disparities. The amplitude of the electronic signal generated by the transducer in response to an acoustic wave is dependent on the gain of a transducer. Phase is related to the response time of a transducer, i.e. to the delay between reception of an acoustic wave and the formation of an electronic signal in response to this wave.

Prior to the use of an antenna, a calibration phase is necessary, to correct the disparities between the gains and phases of each transducer. Generally, during this calibration phase, a calibration source, the location of which must be precisely controlled, is used.

The inventors have designed a calibrating method that is simple to implement, and that may be carried out manually, without needing to precisely position the calibration source.

SUMMARY OF THE INVENTION

A first subject of the invention is a method for calibrating an acoustic antenna, the acoustic antenna comprising a plurality of transducers, each transducer being able to generate an electrical signal under the effect of a detection of an acoustic wave, the antenna comprising elementary transducers distributed over an antenna row or an antenna plane, about a reference transducer, the antenna defining a main axis, passing through the reference transducer, and perpendicular to the antenna row or antenna plane, the method comprising:
  a) placing a calibration source in at least one position with respect to the antenna, the calibration source being able to transmit a calibration acoustic wave that propagates to the antenna;
  b) measuring signals generated by all or some of the elementary transducers in response to the calibration acoustic wave;
  c) on the basis of the measurements performed in step b), determining a temporal phase shift of the signal respectively generated by each elementary transducer, each temporal phase shift being defined with respect to a reference signal generated by the reference transducer;
  d) reiterating a) to c), for example up to a preset number of iterations, in such a way that, in at least one iteration, the position of the calibration source may be considered to be centered on the main axis;
  the method comprising estimating a phase shift, called the intrinsic phase shift, of each elementary transducer with respect to the reference transducer, the estimation of the phase shift comprising:
  e) concatenating temporal phase shifts determined in each step c), so as to form a vector of measured phase shifts;
  f) taking into account a change-of-basis matrix;
  g) on the basis of the change-of-basis matrix and of the vector of measured phase shifts, estimating a phase shift of each elementary transducer with respect to the reference transducer.

According to one embodiment, the antenna extends along a longitudinal axis. At least one iteration of steps a) to c) is implemented with the calibration source placed in a position off the main axis, such that the acoustic wave transmitted by the calibration source propagates to the reference transducer in such a way as to make a first angle to the longitudinal axis. The method is then such that:
  in step f), the change-of-basis matrix contains the respective distances, along the longitudinal axis, between the reference transducer and each elementary transducer;
  step g) comprises estimating the first angle.

In the change-of-basis matrix, the distances between the reference transducer and each elementary transducer, along the longitudinal axis, may be normalized by a propagation speed of the acoustic wave.

The antenna may also extend along a lateral axis that is secant to the longitudinal axis, such that the acoustic wave transmitted by the calibration source propagates to the reference transducer in such a way as to make a second angle to the lateral axis. The method is then such that:
  in step f), the change-of-basis matrix contains the respective distances, along the lateral axis, between the reference transducer and each elementary transducer;
  step g) comprises estimating the second angle.

According to one embodiment:
  the iterations of steps a) to c) are repeated, the calibration source being centered with respect to the main axis;
  the change-of-basis matrix contains a concatenation of a number of identity matrices equal to the number of iterations performed, the size of each identity matrix corresponding to the number of elementary transducers for which it is desired to determine the phase shift.

The iterations of steps a) to c) may be repeated a plurality of times for at least one given position of the calibration source.

For all or some of the elementary transducers, the method may comprise a step h) of transmitting an acoustic wave to the antenna, and of comparing the signals respectively generated by each elementary transducer and by the reference transducer in response to the transmitted acoustic wave, so as to assign a gain to each elementary transducer on the basis of the comparison. The comparison may be or comprise a ratio between the respective integrals of the absolute values of the signals respectively generated by each elementary transducer and by the reference transducer.

Steps e) to g) are generally implemented by a processing unit connected to the transducers of the antenna.

According to one embodiment, a transducer of the antenna transmits an acoustic wave to a reflector placed facing the antenna, in such a way that the acoustic wave reflected by the reflector forms the calibration acoustic wave.

A second subject of the invention is an acoustic antenna, comprising a plurality of transducers, each transducer being configured to generate an electrical signal under the effect of a detection of an acoustic wave, the antenna comprising elementary transducers distributed over an antenna row or an antenna plane, about a reference transducer, the antenna defining a main axis, passing through the reference transducer, and perpendicular to the antenna row or antenna plane, the antenna comprising a processing unit, configured to implement steps c) to g) of a method according to the first subject of the invention, on the basis of signals generated by all or some of the elementary transducers in response to a calibration acoustic wave transmitted by a calibration acoustic source placed facing the antenna.

The invention will be better understood on reading the description of examples of embodiments, which are presented in the rest of the description, with reference to the figures listed below.

FIGURES

Figure 2A:
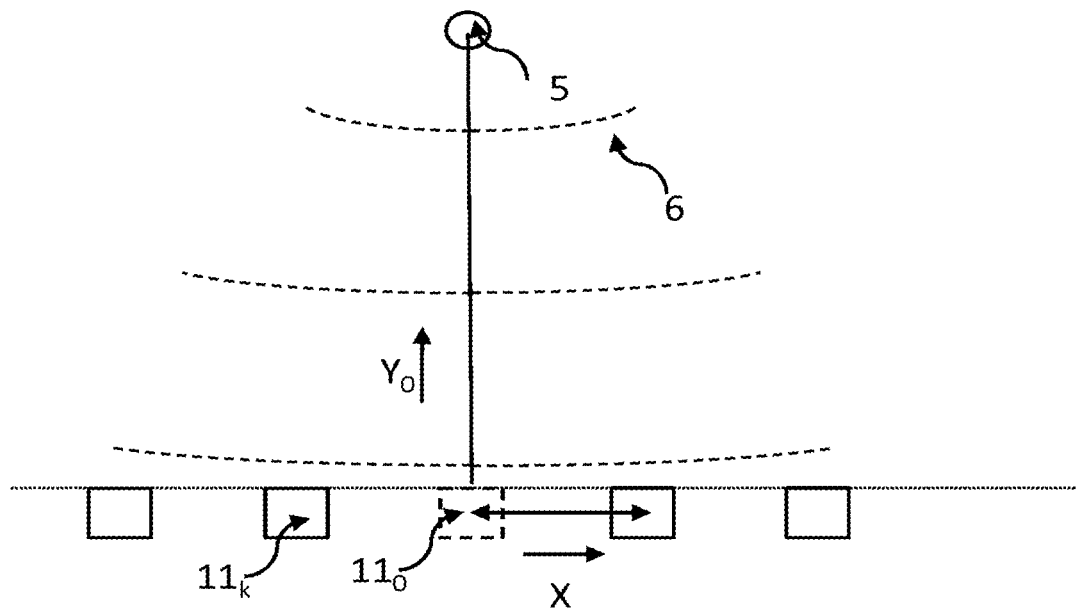
Figure 2B:
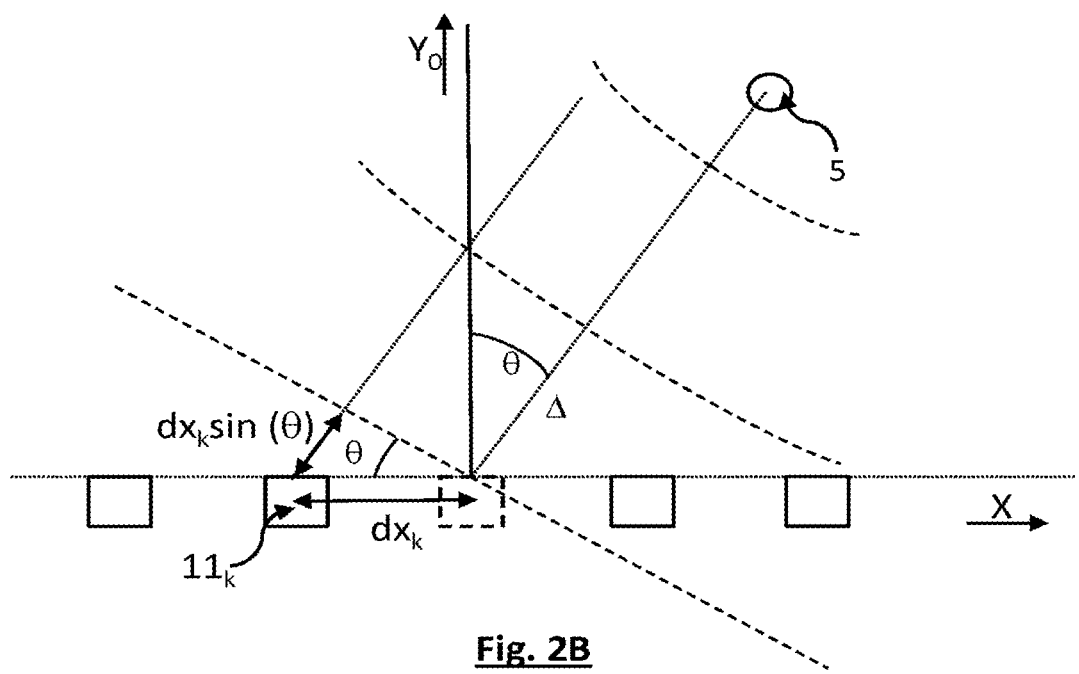

FIGS. 2A and 2B show an acoustic wave propagating to an acoustic antenna comprising transducers aligned in a row. In FIG. 2A, the wave propagates about a propagation axis that is perpendicular to the row. In FIG. 2B, the wave propagates about a propagation axis that is inclined with respect to the row.

Figure 2C:
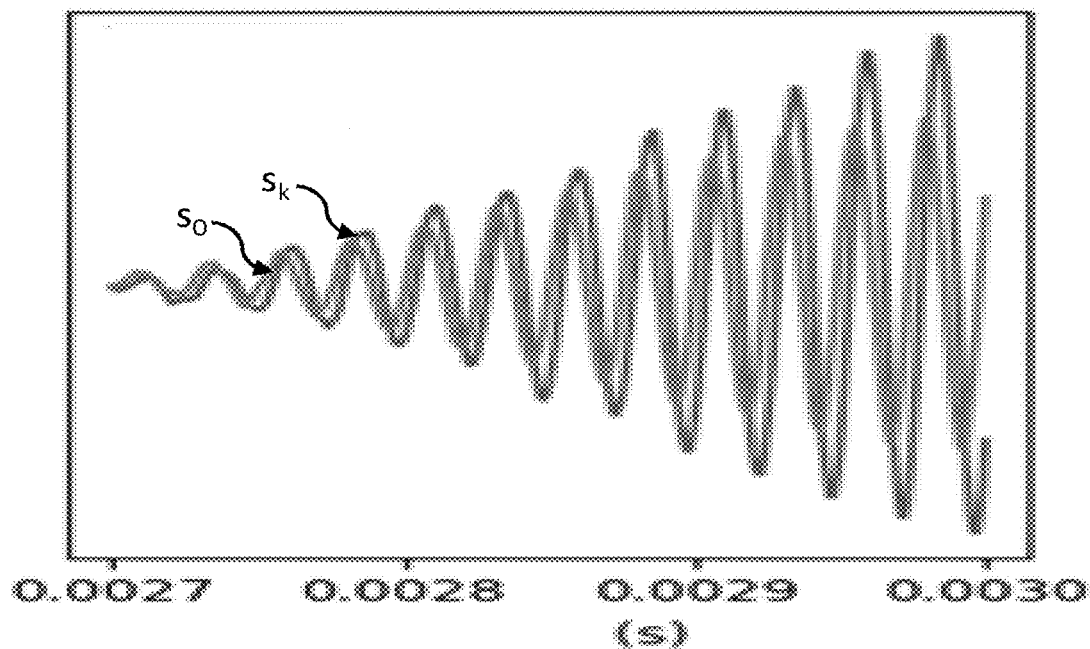

FIG. 2C is an example of signals respectively generated by two transducers before a calibration of the phase shift.

Figure 2D:
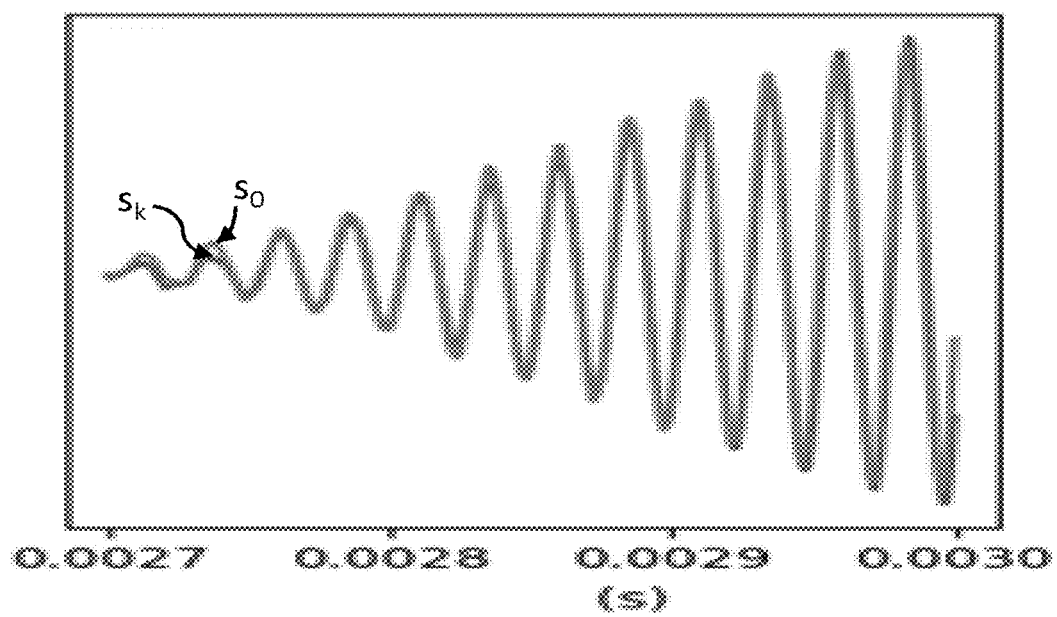

FIG. 2D is an example of signals respectively generated by two transducers after a calibration of the phase shift.

Figure 3:
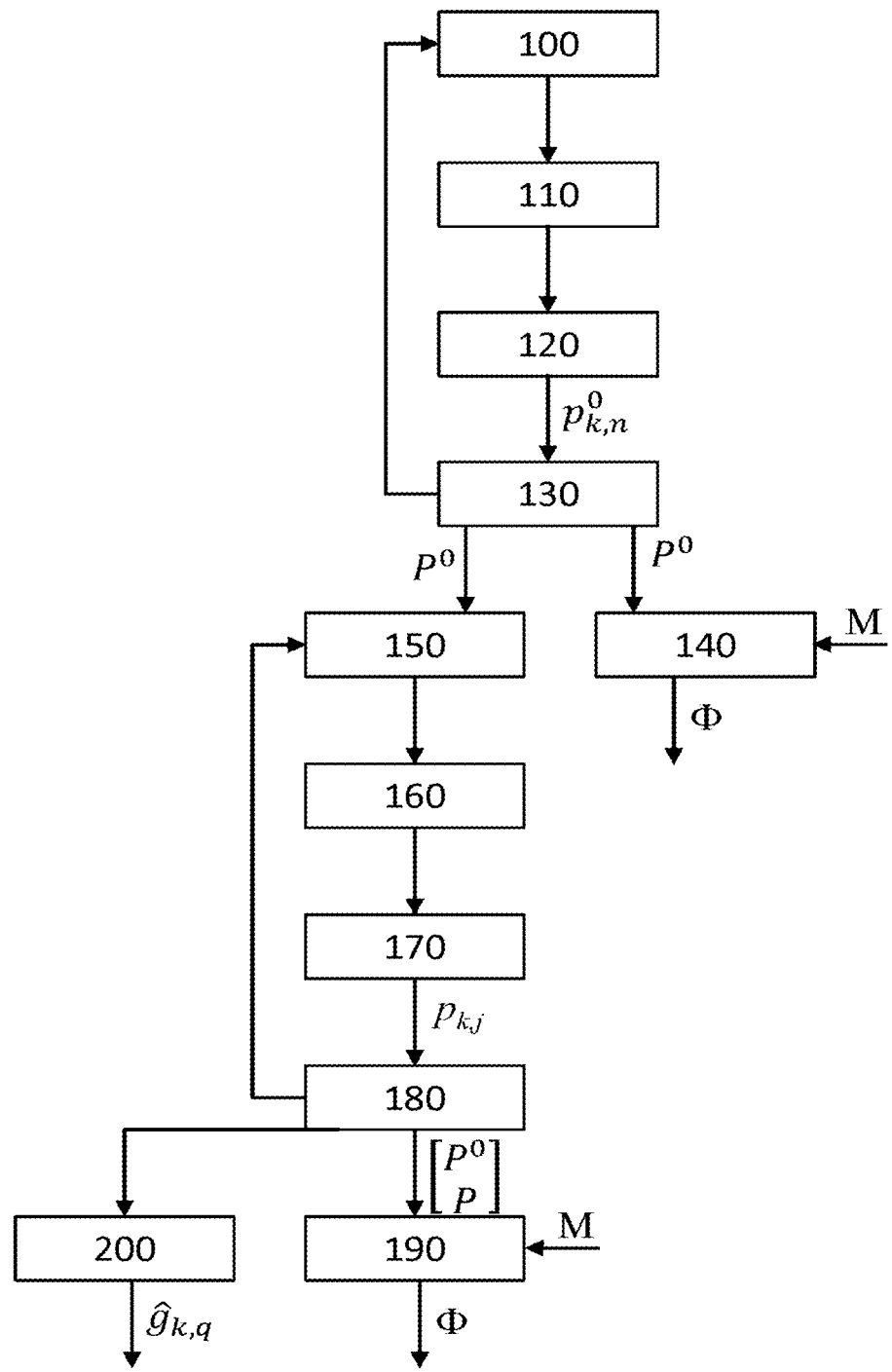

FIG. 3 illustrates the main steps of a method for calibrating the antenna.

Figure 4:
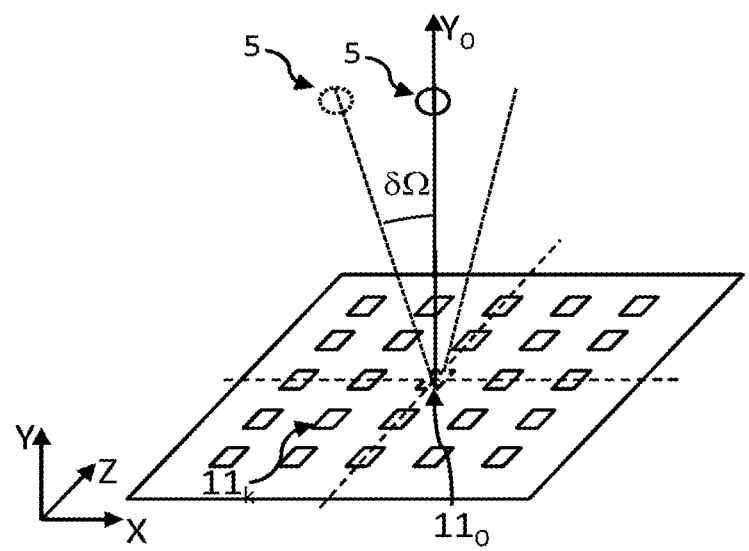

FIG. 4 shows a calibration configuration in which a calibration source is placed on a main axis of an antenna.

Figure 5A:
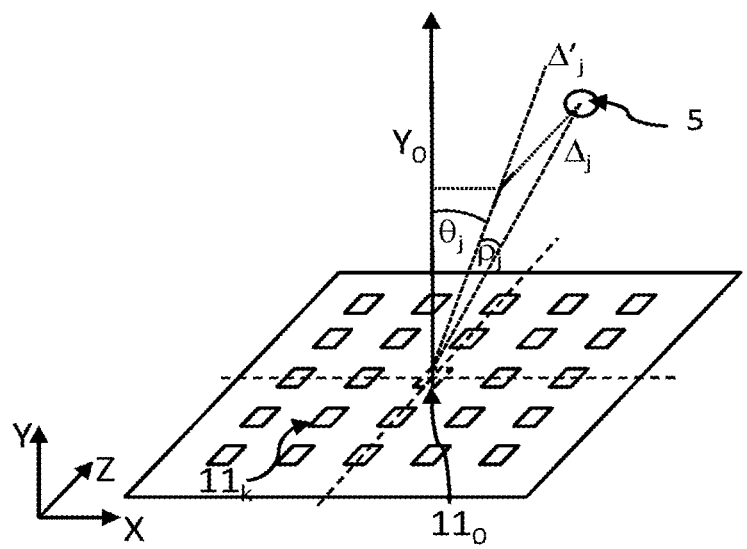

FIG. 5A shows a calibration configuration in which a calibration source is placed at distance from the main axis of a planar antenna.

Figure 5B:
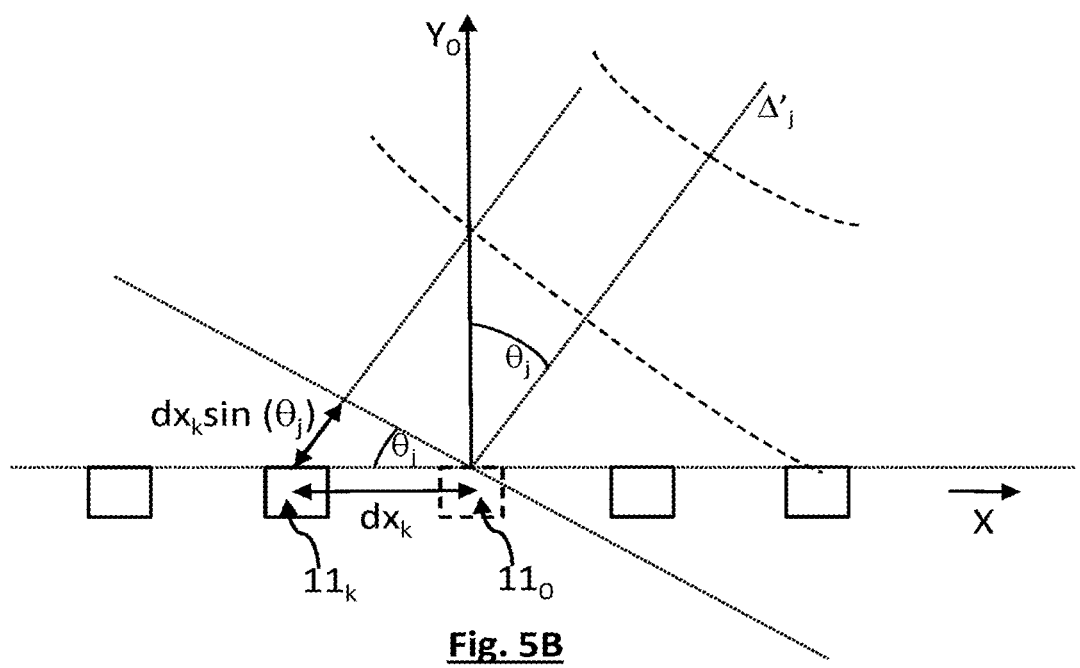

FIG. 5B shows a detail of the configuration shown in FIG. 5A. The calibration acoustic wave propagates to the antenna in such a way as to make a first angle to a longitudinal axis of the antenna plane.

Figure 5C:
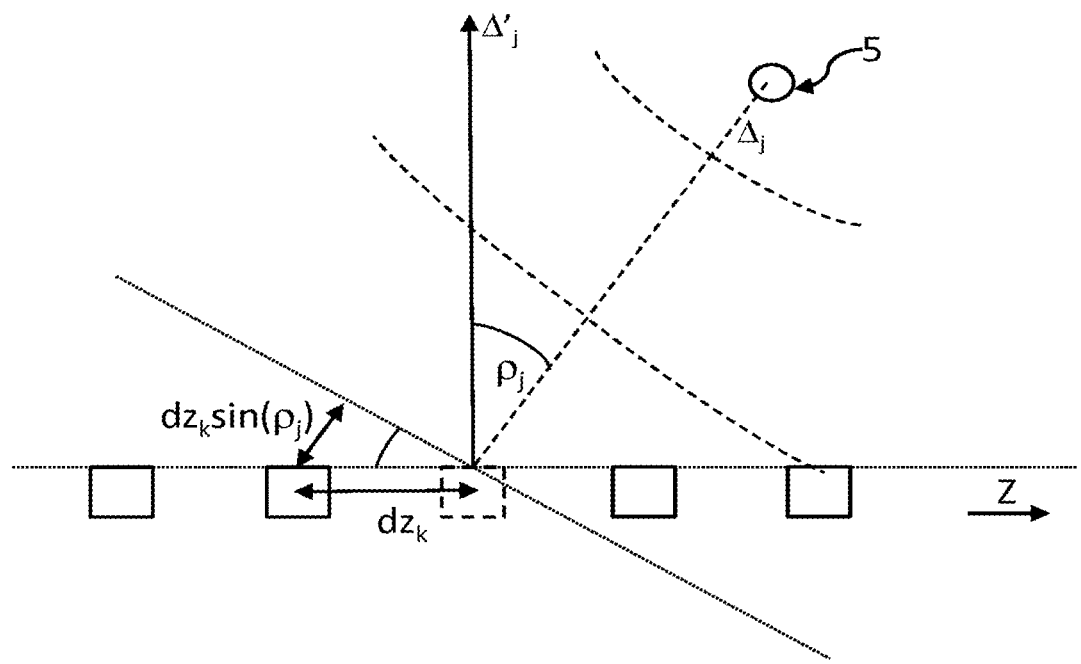

FIG. 5C shows a detail of the configuration shown in FIG. 5A. The calibration acoustic wave propagates to the antenna in such a way as to make a second angle to a lateral axis of the antenna plane.

Figure 6:
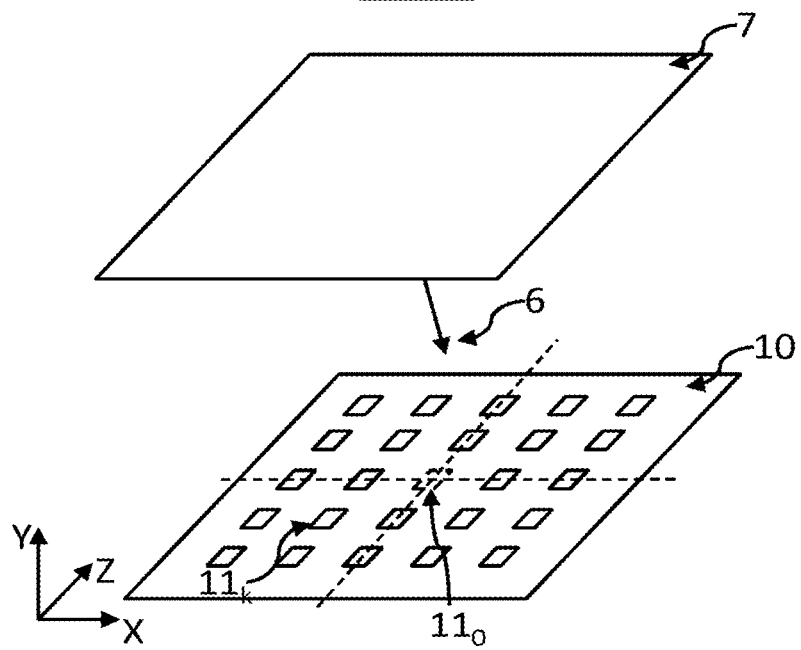

FIG. 6 shows a calibration configuration in which a reflector reflects an acoustic wave generated by a transducer of the antenna, the acoustic wave thus reflected forming the calibration acoustic wave.

DESCRIPTION OF PARTICULAR EMBODIMENTS

Figure 1A:
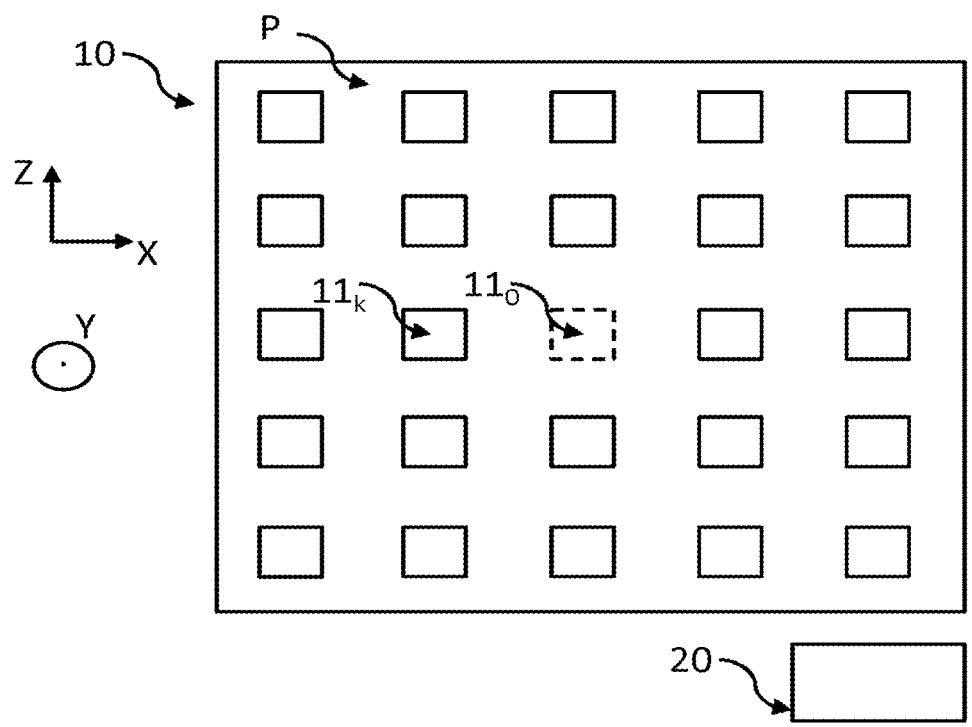
FIG. 1A shows a planar acoustic antenna, the antenna comprising acoustic transducers distributed over a plane.

FIG. 1A shows a planar acoustic antenna 10. Such an antenna comprises elementary acoustic transducers $11_k$ distributed over an antenna plane P. The elementary transducers are distributed over the antenna plane, about a reference transducer $11_0$. The antenna plane P extends along a longitudinal axis X, defining rows, and along a lateral axis Z, defining columns. The antenna plane P is orthogonal to an axis Y. The longitudinal axis X and the lateral axis Z are secant, and preferably perpendicular to each other. The antenna 10 comprises a main axis $Y_0$, perpendicular to the antenna plane P, and passing through the reference transducer $11_0$.

The antenna 10 is connected to a processing unit 20, a processor or microprocessor for example. The processing unit 20 receives the signals generated by each transducer of the antenna, via a wired or wireless link. The processing unit is configured to execute certain steps of a calibration of the antenna, in particular when these steps require computing means.

Figure 1B:
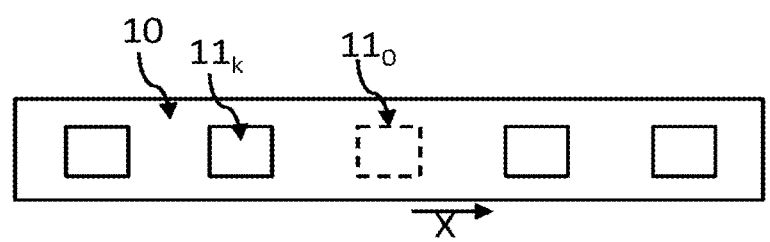
FIG. 1B shows a linear acoustic antenna, the antenna comprising acoustic transducers distributed over a row.

FIG. 1B shows a linear acoustic antenna 10. Such an antenna comprises elementary transducers $11_k$ distributed over a row parallel to a longitudinal axis X. The index k designates each acoustic transducer, k being an integer comprised between 0 and K, the total number of acoustic transducers, including the reference transducer, being equal to K+1: one reference transducer, about which extend K elementary transducers.

The calibrating method described below may be applied to a planar or linear antenna 10 such as schematically shown in FIGS. 1A and 1B.

FIG. 2A shows an acoustic source 5, called the calibration source, placed on the main axis $Y_0$ of an antenna. The source emits a calibration acoustic wave 6, which may have a preset temporal form. It may for example be a question of a sinusoid the amplitude of which is modulated, over time, by a decreasing function. The calibration acoustic wave 6 propagates to the antenna 10, in the form of a planar wave. Under the effect of the detection of the calibration acoustic wave 6 emitted by the acoustic source 5, the transducers of the antenna 10 generate a detection signal. FIG. 2C schematically shows the detection signals $s_0$, $s_k$ respectively recorded by the reference transducer $11_0$ and an elementary transducer $11_k$ that is adjacent thereto, the two transducers being aligned in the same row. It may be seen that there is a temporal offset between the two signals. This offset is due to a temporal phase shift between the reference transducer $11_0$ and the elementary transducer $11_k$. Specifically, each elementary transducer $11_k$ is affected by a phase $\Phi_k$, called the intrinsic phase. The intrinsic phase of an elementary transducer corresponds to a temporal offset $\Phi_k$ with respect to the reference transducer in the presence of an acoustic wave detected simultaneously by the transducer in question and the reference transducer. The phase $\Phi_0$ of the reference transducer is arbitrarily considered to be zero. Thus, the phase shift between an elementary transducer and the reference transducer corresponds to the phase $\Phi_k$ affecting the elementary transducer.

The phase $\Phi_k$ of each elementary transducer does not change. It results from variability in the manufacture of the transducer, or from variability affecting the signal-forming electronic circuits connected to the transducer. Initially, the phase $\Phi_k$ of each elementary transducer is unknown and may be considered to be randomly distributed. The objective of the calibration described below is to estimate it, so as to improve the accuracy of the acoustic measurements performed using the antenna.

FIG. 2D shows the signals respectively generated by the reference transducer and the transducer in question after calibration, i.e. after the phase of the transducer $11_k$ has been taken into account. It may be seen that, after the calibration, the signals are synchronous.

FIG. 2C also shows that the amplitudes of the signals $s_0$ and $s_k$ are different. However, the transducers are being subjected to a spatially uniform acoustic wave. The disparity in the amplitudes may therefore be attributed to a variability in the response of the transducers in question. Another objective of the calibration is to estimate a gain $g_k$ of each elementary transducer, relative to the reference transducer, so as to correct the variations in amplitude of the signals generated by the various transducers of a given antenna, in response to an acoustic wave of uniform amplitude. In FIG. 2D, it may be seen that the amplitudes of the signals $s_0$ and $s_k$ are similar.

Thus, the calibration allows a gain and a phase to be attributed to each elementary transducer $11_k$, relative to the reference transducer, such that:

$$s_k(t) = g_k s_0(t + \phi_k) \quad (1)$$

where $s_k(t)$ and $s_0(t)$ are respectively the detection signals generated by the transducer $11_k$ and the reference transducer $11_0$. The calibration then allows the variations in amplitude and in response time of each transducer to be taken into account.

FIG. 2B shows another calibration configuration, in which the acoustic source is not centered with respect to the main axis of the antenna, but is placed at distance from the latter. The acoustic wave 6 reaches the antenna plane P at an angle of incidence $\theta$ with respect to the axis X. More precisely, the acoustic wave propagates along a propagation axis $\Delta$ making the angle of incidence $\theta$ to the axis X. Thus, each wavefront reaches the various transducers of the antenna with a temporal offset induced by the oblique incidence of the calibration acoustic wave. If detection of the wave 6 by the reference transducer is considered to occur at a reference time $t_0$, the wave reaches a transducer, placed in the same row, at a time:

$$t_k = t_0 + \frac{dx_k \sin\theta}{c} \quad (2)$$

where $dx_k$ corresponds to the algebraic distance, along the longitudinal axis X, between the transducer $11_k$ in question and the reference transducer $11_0$ and c is the propagation speed of the acoustic wave. The algebraic distance is a distance assigned a sign, depending on the position of the elementary transducer in question with respect to the reference transducer. This allows for the fact that certain transducers detect the acoustic wave before the reference transducer, in which case the distance $dx_k$ is negative, and other transducers detect the acoustic wave after the reference transducer, in which case the distance $dx_k$ is positive.

Thus, the emission of the detection signal is offset, with respect to the reference signal, by a positive or negative temporal offset equal to $$\frac{dx_k \sin\theta}{c},$$

to which is added the intrinsic phase shift $\Phi_k$, the latter not changing and being transducer dependent.

The main steps of a calibration method will now be described with reference to FIG. 3.

Step 100: Placing a calibration acoustic source facing the antenna 10, and more precisely along the main axis $Y_0$. In this configuration, the source occupies a centered position $r_0$ facing the antenna, as shown in FIG. 4. By along the main axis, what is meant is placed on the main axis $Y_0$ to within an angular tolerance $\delta\Omega$, for example to within an angle smaller than +/−10° or +/−5° with respect to the axis $Y_0$. It is a question of the angle made by the main axis $Y_0$ and a straight line connecting the reference transducer $11_0$ and the calibration source. During this step, a laser pointer on the antenna may be used, said pointer being arranged to emit a light beam along the main axis $Y_0$ of the antenna. This allows manual positioning of the antenna along the main axis, or in the vicinity of the antenna, i.e. to within the angular tolerance $\delta\Omega$, to be facilitated, Step 110: Transmitting a calibration acoustic wave 6 with the calibration source 5 and acquiring signals generated by the transducers of the antenna in response to the calibration acoustic wave. The transmitted acoustic wave is preferably pulsed. The duration of the pulse is for example comprised between 1 period and 10 or even more periods of the wave. For example, in the case of an ultrasonic wave at the frequency of 40 kHz, the duration of the pulse may be comprised between 25 μs and 250 μs. The calibration acoustic wave may be sinusoidal, and its amplitude may be temporally modulated by an apodization window, as shown in FIGS. 2C and 2D.

In this type of configuration, as schematically shown in FIG. 2A, the acoustic wave is a planar wave by the time it reaches each transducer of the antenna. Each wavefront may be considered to reach the transducers simultaneously. To within the angular tolerance $\delta\Omega$, each phase shift affecting the signals generated by the various elementary transducers $11_k$ is solely due to the intrinsic phase shift $\Phi_k$ affecting each thereof.

Step 120:

Determining a phase difference $p_{k,n}^0$ between each signal $s_{k,n}$ generated by an elementary transducer and the reference signal $s_{0,n}$ generated by the reference transducer. Such a phase difference may be determined by means known to those skilled in the art, for example a frequential analysis of these signals, or by temporal analysis by correlation. The exponent 0 designates the fact that the calibration is carried out while the calibration source 5 is centered with respect to the reference transducer.

The index n is an integer comprised between 1 and N. It designates the iteration rank. N corresponds to the number of iterations.

The phase difference $p_{k,n}^0$ may be modeled by the following analytical expression:

$$p_{k,n}^0 = \phi_k + \varepsilon^0 \quad (3)$$

where $\varepsilon^0$ is an uncertainty term, of zero mean value, expressing the uncertainty as to the separation of the calibration source from the main axis $Y_0$, and the uncertainty related to the determination of the phase difference $p_{k,n}^0$.

The term $\varepsilon^0$ is explained in detail in the description below (cf. step 170).

Step 130:

Reiterating steps 100 to 130. Between each iteration, the calibration source may be kept in the same position, or moved, provided that it may be considered to be centered, according to the definition indicated in step 100. Reiterating is not indispensable, but it is advantageous because it allows measurement uncertainty to be decreased, as described below. Steps 100 to 130 may be reiterated by a preset number of iterations.

Step 140: Estimating the phase of the transducers.

At the end of step 130, K×N phase differences $p_{k,n}^0$ will have been obtained. Neglecting the noise term $\varepsilon^0$, the phase differences are concatenated so as to form a vector $P^0$ of measured phase shifts, of (K×N, 1) size, such that:

$$P^0 = \begin{bmatrix} p^0_{1,1} \\ p^0_{2,1} \\ \vdots \\ p^0_{K,1} \\ p^0_{1,2} \\ \vdots \\ p^0_{K,N} \end{bmatrix} = \begin{bmatrix} I_K \\ \vdots \\ I_K \end{bmatrix} \cdot \begin{bmatrix} \phi_1 \\ \vdots \\ \phi_K \end{bmatrix} \quad (4)$$

where:
- · designates matrix multiplication;
- $I_K$ is an identity matrix of (K, K) size;
- the matrix $$M = \begin{bmatrix} I_K \\ \vdots \\ I_K \end{bmatrix}$$

is a change-of-basis matrix of (K×N, K) size, resulting from the concatenation of N identity matrices $I_K$.

Let $$\Phi = \begin{bmatrix} \phi_1 \\ \vdots \\ \phi_K \end{bmatrix}.$$

The vector $\Phi$ is a vector of (K, 1) size, containing the phases $\Phi_k$ of each transducer. These are unknowns.

The matrix M is a change-of-basis matrix, forming the link between the vector $P^0$ of the measured phase shifts and the vector $\Phi$. In this configuration, the change-of-basis matrix is simply N concatenated identity matrices.

Inversion of equation (3) allows the vector $\Phi$ to be estimated. The vector $\Phi$ may be estimated using a matrix-inversion algorithm known to those skilled in the art.

Performing a plurality of iterations of steps 100 to 130 allows the accuracy with which the phases $\Phi_k$ are determined to be improved, this accuracy varying as a function of $\sqrt{N}$.

According to one preferred embodiment, the calibration source 5 is also used in an off-centered manner, i.e. when at distance from the main axis $Y_0$, as shown in FIG. 5A. In this embodiment, steps 100 to 130 are performed using the calibration source in a configuration that may be considered to be centered. Following step 130, the calibration source is placed at distance from the main axis $Y_0$. The method then continues with the following steps.

Step 150: Placing the calibration source facing the antenna 10, at distance from the main axis $Y_0$. The source is placed in an off-centered position (i.e. at distance from the main axis) $r_j$. The index j designates an iteration rank of steps 150 to 180. j is an integer comprised between 1 and J. J corresponds to the number of iterations performed while the source is off-centered. One of the particularities of the method is that it is not necessary to know the position $r_j$. This aspect is detailed below, with reference to step 180.

Step 160: Transmitting a calibration acoustic wave 6 with the calibration source and acquiring signals generated by the transducers of the antenna in response to the calibration acoustic wave. The calibration acoustic wave is preferably such as described with reference to step 110. Because of the off-centeredness of the calibration source with respect to the main axis $Y_0$ of the antenna, each wavefront propagates to the antenna parallel to a propagation axis $\Delta_j$ that is inclined with respect to the antenna plane. The propagation axis $\Delta_j$ corresponds to the axis extending between the calibration source 5, placed in the position $r_j$, and the reference transducer $11_0$. The inclination of the propagation axis $\Delta_j$ may be expressed by two inclination angles. For example, as shown in FIGS. 5A, 5B and 5C, the calibration acoustic wave propagates to the antenna in such a way that the wave makes:

a first angle $\theta_j$ between the main axis $Y_0$ and a projection $\Delta'_j$ of the propagation axis $\Delta_j$ into a plane containing the main axis $Y_0$ and the longitudinal axis X.

a second angle $\rho_j$ between the propagation axis $\Delta_j$ and the projection $\Delta'_j$ of the latter into the plane $(Y_0, X)$.

The first angle $\theta_j$ corresponds to an inclination of the propagation axis $\Delta_j$, the inclination being projected into a plane passing through the main axis $Y_0$ and the longitudinal axis X. The second angle $\rho_j$ corresponds to an inclination of the propagation axis $\Delta_j$, the inclination being projected into a plane passing through the projection $\Delta'_j$ and the lateral axis Z.

Step 170:

Step 170 comprises determining a phase difference $p_{k,j}$ between each signal $s_{k,j}$ generated by an elementary transducer and the reference signal $s_{0,j}$ generated by the reference transducer while the source occupies a position $r_j$.

The phase difference $p_{k,j}$ may be modeled by the following analytical expression:

$$p_{k,j} = \phi_k + \frac{dx_k}{c}\sin(\theta_j) + \frac{dz_k}{c}\sin(\rho_j)\cos(\theta_j) + \varepsilon \quad (6)$$

$dx_k$ and $dz_k$ corresponding to the distances between each transducer $11_k$ and the reference transducer $11_0$, the distances being computed along the longitudinal axis X and the lateral axis Z, respectively.

The term $\varepsilon$ is a noise term, the mean value of which is considered to be zero. $\varepsilon$ may be considered to follow a normal distribution of zero mean and of variance $\sigma^2$. This term takes into account the uncertainties in the estimation of the phase difference $p_{k,j}$.

When the angles $\theta_j$ and $\rho_j$ are small, i.e. when the position of the calibration source may be considered to be centered, expression (6) tends toward expression (3). Specifically, at small angles, $$p_{k,j} = \phi_k + \frac{dx_k}{c}\theta_j + \frac{dz_k}{c}\theta_j + \varepsilon \cong \phi_k + \varepsilon^0 \quad (6')$$

The angles $\theta_j$ and $\rho_j$ follow a normal distribution of zero mean and of variance $\sigma^2$.

The error term $\varepsilon^0$ follows a normal distribution of zero mean and of variance equal to $$\frac{dx_k^2 + dz_k^2}{c^2}\sigma_0^2 + \sigma^2$$

Step 180

Reiterating steps 150 to 170. Between each iteration, the calibration source may be kept in the same position or moved. The reiteration allows measurement uncertainty to be decreased, as described below.

Step 190: Estimating the phase of the transducers.

At the end of step 180, the following will have been obtained:

K×N phase differences $p_{k,n}^0$, obtained in the iterations of steps 100 to 120;

K×J phase differences $p_{k,j}$, obtained in the iterations of steps 150 to 170.

Neglecting the term ε, the K×J phase differences $p_{k,j}$ may be concatenated so as to form a vector P, of (K×J, 1) size, such that:

$$P = \begin{bmatrix} p_{1,1} \\ p_{2,1} \\ \vdots \\ p_{K,1} \\ p_{1,2} \\ \vdots \\ p_{K,J} \end{bmatrix} = \begin{bmatrix} I_K & D_1\left(\frac{x}{c}\right) & D_1\left(\frac{x}{c}\right) \\ \vdots & \vdots & \vdots \\ I_K & D_J\left(\frac{z}{c}\right) & D_J\left(\frac{z}{c}\right) \end{bmatrix} \cdot \begin{bmatrix} \phi_1 \\ \vdots \\ \phi_K \\ \sin(\theta_1) \\ \vdots \\ \sin(\theta_J) \\ \sin(\rho_1) \\ \vdots \\ \sin(\rho_J) \end{bmatrix} \quad (7)$$

$$F = \begin{bmatrix} I_K & D_1\left(\frac{x}{c}\right) & D_1\left(\frac{x}{c}\right) \\ \vdots & \vdots & \vdots \\ I_K & D_J\left(\frac{z}{c}\right) & D_J\left(\frac{z}{c}\right) \end{bmatrix}$$

is a matrix of (K×J, K+J+J) size.

The matrix F is obtained by concatenating identity matrices $I_K$ and matrices $D_j$, of (K, J) size containing only zeros, except in the $j^{th}$ column.

Thus, each matrix $D_j$ is such that:

$$D_j\left(\frac{x}{c}\right) = \begin{bmatrix} 0 & \frac{dx_1}{c} & 0 \\ \vdots & \vdots & \vdots \\ 0 & \frac{dx_K}{c} & 0 \end{bmatrix} \text{ and}$$

$$D_j\left(\frac{z}{c}\right) = \begin{bmatrix} 0 & \frac{dz_1}{c} & 0 \\ \vdots & \vdots & \vdots \\ 0 & \frac{dz_K}{c} & 0 \end{bmatrix}$$

The vector $$a = \begin{bmatrix} \phi_1 \\ \vdots \\ \phi_K \\ \sin(\theta_1) \\ \vdots \\ \sin(\theta_J) \\ \sin(\rho_1) \\ \vdots \\ \sin(\rho_J) \end{bmatrix}$$

contains the unknowns, i.e. the phase shifts $\Phi_k$ of each elementary transducer, and the angles $\theta_j$, $\rho_j$ made by the wave transmitted by the calibration source in each iteration of steps 150 to 180. The size of the vector a is (K+J+J,1). It will be noted that $$a = \begin{bmatrix} \Phi \\ \sin(\theta_1) \\ \vdots \\ \sin(\theta_J) \\ \sin(\rho_1) \\ \vdots \\ \sin(\rho_J) \end{bmatrix}$$

with:

$$\Phi = \begin{bmatrix} \phi_1 \\ \vdots \\ \phi_K \end{bmatrix}$$

Expressions (3) and (6) may be expressed in matrix form as follows:

$$\begin{bmatrix} P^0 \\ P \end{bmatrix} = \begin{bmatrix} F^0 \\ F \end{bmatrix} a + \begin{bmatrix} E^0 \\ E \end{bmatrix} \quad (7)$$

with $$F^0 = \begin{bmatrix} I_K & 0_{K,2J} \\ \vdots & \vdots \\ I_K & 0_{K,2J} \end{bmatrix}$$

The matrix $F^0$, of (K, K+J+J) size, is a concatenation of $I_K$ identity matrices and of $O_{K,\,2J}$ matrices. Each matrix $O_{K,\,2J}$ is of (K, 2J) size, and contains only zeros.

According to this embodiment, the matrix $$M = \begin{bmatrix} F^0 \\ F \end{bmatrix}$$

is a change-ot-basis matrix for changing between the vector of measured phase shifts $$\begin{bmatrix} P^0 \\ P \end{bmatrix}$$

and the vector a, the latter containing the vector of the phases Φ.

Thus, according to this embodiment, the change-of-basis matrix M contains the respective distances $dx_k$ and $dz_k$ of each transducer with respect to the reference transducer. The distances are normalized by the propagation speed c of the acoustic wave.

The vector $$\begin{bmatrix} P^0 \\ P \end{bmatrix}$$

results from the concatenation of the vectors $P^0$ and P. Its size is (K×N+K×J, 1).

The vector $$\begin{bmatrix} E^0 \\ E \end{bmatrix}$$

is of (K×N+K×J, 1) size. It is a concatenation of:
  a vector $E^0$, of (K×N,1) size, following a multidimensional normal distribution of K×N size, parameterized by a mean vector $\mu^0$, of (K×N,1) size, each term of which is zero, and by a covariance matrix $\Sigma$, of (K×N, K×N) size. It is also possible to consider, instead of a normal distribution, a Student's t-distribution.

a vector E, of (K×J, 1) size, following a multidimensional normal distribution of K×J size, parameterized by a mean vector $\mu$, of (K×J,1) size, each term of which is zero, and by a covariance matrix $\sigma I_{KJ}$, of (K×J, K×J) size, where $I_{KJ}$ is an identity matrix of (K×J, K×J) size.

It is possible to estimate a vector a that satisfies equation (7) by implementing an inversion algorithm. For example, the vector a may be estimated via a least-squares method, using the expression:

$$\hat{a}=(F^{0^T}\Sigma^{-1}F^0+\sigma^{-2}F^TF)^{-1}(F^{0^T}\Sigma^{-1}P^0+\sigma^{-2}F^TP) \quad (8)$$

where:
$\Sigma$ is a diagonal matrix of (K,K) size, each term of the diagonal containing variances $\sigma_k$ obtained from the phase-shift measurements resulting from step 170;
Each variance $\sigma_k$ of the matrix $\Sigma$ is computed using the equation:

$$\frac{dx_k^2 + dz_k^2}{c^2}\sigma_0^2 + \sigma^2.$$

The term $\sigma^2$ is a scalar expressed in units of time and represents the accuracy of the phase estimator described with reference to step 170. If, in this step, the signal is sampled with a sampling period $T_e$, $\sigma$ may be such that: $\sigma=T_e$ when the estimator is considered to be accurate. It may be such that $\sigma=20T_e$ when the estimator is considered to be less accurate. The sampling period $T_e$ corresponds to the inverse of the sampling frequency.

Thus, the formalism described with reference to equation (7) allows an estimation of $\hat{a}$ via a simple method, for example of least-squares type (cf. (8)). Alternatively to implementing a matrix-inversion algorithm, the vector $\hat{a}$ may be estimated via a Cholesky decomposition applied to the matrix $F^{0^T}\Sigma^{-1}F^0+\sigma^{-2}F^TF$, which is symmetric and defined positive.

With such a decomposition, the matrix $F^{0^T}\Sigma^{-1}F^0+\sigma^{-2}F^TF$ may be decomposed by defining a decomposition matrix L such that:

$$LL^T=F^{0^T}\Sigma^{-1}F^0+\sigma^{-2}F^TF \quad (9)$$

L is a triangular matrix that may be defined beforehand, provided that the values of $\Sigma$, $\sigma$ and of $\sigma_0$ are taken into account. L may for example be stored, in a memory of the processing unit 20, the latter possibly being on-board. It is then easily possible to estimate b by solving the equation:

$$L^Tb=F^{0^T}\Sigma^{-1}P^0+\sigma^{-2}F^TP \quad (10)$$

then to estimate a such that:

$$L^T\hat{a}=b \quad (11)$$

Whatever the embodiment, the estimation of $\hat{a}$ allows an estimation of the vector $\Phi$ containing the sought-after phases $\Phi_k$ to be obtained.

Following step 190, an estimation of the phase $\Phi_k$ of each transducer will have been obtained. It is then possible to use the latter to correct the signals $s_k(t)$ respectively generated by each transducer.

It will be noted that during the implementation of steps 150 to 180, it is not necessary to know the position of the source $r_j$. This is due to the fact that the angles of incidence $\theta_j$ and $\rho_j$ are unknowns that are estimated via the method. This allows a calibration of the antenna that is particularly easy to be performed.

Moreover, between a plurality of successive iterations, the calibration source may be placed in a given position. Thus, two positions $r_j$, $r_{j+1}$ are not necessarily different from each other.

Step 200: Calibrating the Gain

As mentioned above, each transducer $11_k$ has a gain $g_k$ on which the amplitude of the generated signal $s_k$ is dependent. The signals measured during the calibration procedure described above may be used to estimate the gain $g_k$.

Let q be an index describing the N signals generated by an elementary transducer $11_k$ during the steps 110 to 130 and the J signals generated by the same elementary transducer during the steps 150 to 170: $1 \leq q \leq N+J$. The gain of the elementary transducer may be estimated by comparing a mean of the signals $s_{k,q}$ successively generated by the transducer in question with a mean of the signals $s_{0,q}$ successively generated by the reference transducer.

$$\hat{g}_{k,q} = \frac{1}{N+J}\sum_{q=1}^{N+J}\frac{\int |s_{k,q}(t)|dt}{\int |s_{0,q}(t)|dt} \quad (13)$$

According to one embodiment, at least one transducer of the antenna is configured to be activated, so as to transmit a calibration acoustic wave. It may in particular be a question of the reference transducer. The method described above may be implemented by placing a reflector 7 facing the antenna. The reflector 7 is arranged to reflect the acoustic wave, transmitted by the transducer, to the antenna.

The acoustic wave reflected by the reflector 7 then forms the calibration acoustic wave 6. The orientation of the reflector 7 with respect to the antenna 10 may be modified, so as to make the angles of incidence $\theta$ and $\rho$ vary with respect to the antenna plane. Thus, the reflector acts as a calibration source 5. By modifying the position of the calibration source, which corresponds in this case to an orientation of the reflector, it is possible to vary the angle of incidence of the calibration acoustic wave 6 that propagates to the antenna. When the reflector lies parallel to the antenna, the configuration is a centered configuration, the calibration acoustic wave, when it reaches the antenna plane, forming wavefronts parallel to the latter. The configuration is then such as described with reference to steps 100 to 130. When the inclination of the reflector is modified with respect to the antenna plane, the configuration is such as described with reference to steps 150 to 180.

The invention allows an acoustic antenna to be calibrated using simple means, without requiring the calibration source to be precisely positioned with respect to the antenna.

The invention claimed is:

1. A method for calibrating an acoustic antenna, the acoustic antenna comprising a plurality of transducers, each transducer being configured to generate an electrical signal when detecting an acoustic wave, the antenna comprising elementary transducers distributed over an antenna row or an antenna plane, about a reference transducer, the antenna defining a main axis, passing through the reference transducer, and perpendicular to the antenna row or antenna plane, the method comprising:

a) placing a calibration source in at least one position with respect to the antenna, the calibration source being configured to transmit a calibration acoustic wave that propagates to the antenna;
b) measuring signals generated by all or some of the elementary transducers, including the reference transducer, in response to the calibration acoustic wave;
c) on the basis of the signals measured in step b), determining a temporal phase shift of the signal respectively generated by each elementary transducer, each temporal phase shift being defined with respect to a reference signal measured by the reference transducer;
d) reiterating a) to c), so that, in at least one iteration, the position of the calibration source is considered to be centered on the main axis;
the method further comprising estimating an intrinsic phase shift, of each elementary transducer with respect to the reference transducer, the estimating of the intrinsic phase shift comprising:
e) concatenating temporal phase shifts determined in each step c), with respect to each elementary transducer, so as to form a vector of phase shifts, said vector of phase shifts being stored in a processing unit;
f) taking into account a change-of-basis matrix, said change-of-basis matrix being stored in the processing unit;
g) on the basis of the change-of-basis matrix and of the vector of phase shifts, estimating the intrinsic phase shift of each elementary transducer with respect to the reference transducer.

2. The method as claimed in claim 1, wherein the antenna extends along a longitudinal axis, and wherein at least one iteration of steps a) to c) is implemented with the calibration source placed in a position off the main axis, such that the acoustic wave transmitted by the calibration source propagates to the reference transducer in such a way as to make a first angle to the longitudinal axis, wherein:
in f), the change-of-basis matrix contains the respective distances, along the longitudinal axis, between the reference transducer and each elementary transducer;
g) comprises estimating the first angle.

3. The method of claim 2, wherein, in the change-of-basis matrix, the distances between the reference transducer and each elementary transducer, along the longitudinal axis, are normalized by a propagation speed of the acoustic wave.

4. The method of claim 2, wherein the antenna also extends along a lateral axis that is secant to the longitudinal axis, such that the acoustic wave transmitted by the calibration source propagates to the reference transducer in such a way as to make a second angle to the lateral axis, and wherein:
in f), the change-of-basis matrix contains the respective distances, along the lateral axis, between the reference transducer and each elementary transducer;
g) comprises estimating the second angle.

5. The method of claim 4, wherein, in the change-of-basis matrix, the distances between the reference transducer and each elementary transducer, along the lateral axis, are normalized by a propagation speed of the acoustic wave.

6. The method of claim 1, wherein:
the iterations of a) to c) are repeated, the calibration source being centered with respect to the main axis;
the change-of-basis matrix contains a concatenation of a number of identity matrices equal to the number of iterations performed, the size of each identity matrix corresponding to the number of elementary transducers for which it is desired to determine the phase shift.

7. The method of claim 1, wherein the iterations of a) to c) are repeated for at least one given position of the calibration source.

8. The method of claim 1, comprising, for all or some of the elementary transducers:
h) transmitting an acoustic wave to the antenna, and of comparing the signals respectively generated by each elementary transducer and by the reference transducer in response to the transmitted acoustic wave, so as to assign a gain to each elementary transducer on the basis of the comparison.

9. The method of claim 8, wherein the comparison is a ratio between the respective integrals of the absolute values of the signals respectively generated by each elementary transducer and by the reference transducer.

10. The method of claim 1, wherein steps e) to g) are implemented by a the processing unit connected to the transducers of the antenna.

11. The method of claim 1, wherein a transducer of the antenna transmits an acoustic wave to a reflector placed facing the antenna, so that the acoustic wave reflected by the reflector foil is the calibration acoustic wave.

12. An acoustic antenna, comprising a plurality of transducers, each transducer being configured to generate an electrical signal under the effect of a detection of an acoustic wave, the antenna comprising elementary transducers distributed over an antenna row or an antenna plane, about a reference transducer, the antenna defining a main axis, passing through the reference transducer, and perpendicular to the antenna row or antenna plane, the antenna comprising a processing unit, configured to implement steps c) to g) of a method as claimed in claim 1, on the basis of signals generated by all or some of the elementary transducers in response to a calibration acoustic wave transmitted by a calibration acoustic source placed facing the antenna.

13. The method of claim 1, wherein said change-of-basis matrix forms a mathematical link between the vector of phase shifts and a vector containing intrinsic phase shift of each elementary transducer with respect to the reference transducer.

* * * * *

UNITED STATES PATENT AND TRADEMARK OFFICE
CERTIFICATE OF CORRECTION

PATENT NO. : 11,460,564 B2
APPLICATION NO. : 16/922388
DATED : October 4, 2022
INVENTOR(S) : Regis Perrier et al.

It is certified that error appears in the above-identified patent and that said Letters Patent is hereby corrected as shown below:

In the Claims

In Column 14, Line 35, delete "foil is" and insert -- forms --, therefor.

Signed and Sealed this
Fourth Day of April, 2023

Katherine Kelly Vidal
*Director of the United States Patent and Trademark Office*